Figure 1:
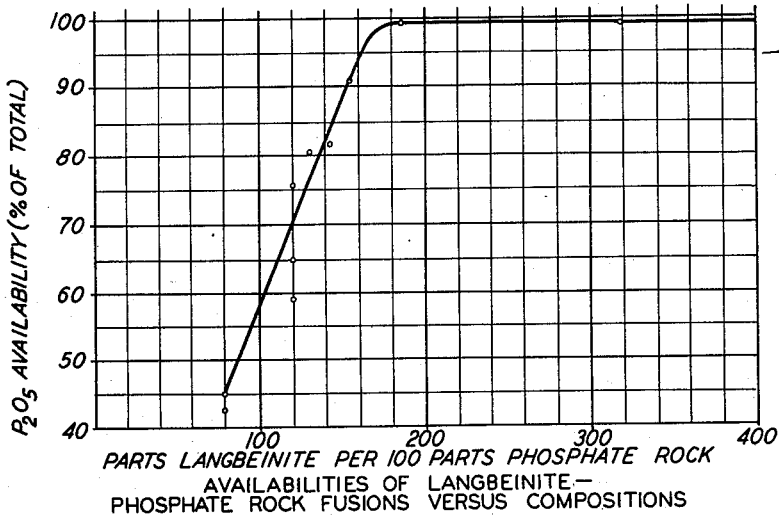

Feb. 19, 1957  G. L. BRIDGER ET AL  2,782,113
FERTILIZER COMPOSITIONS AND METHOD OF PREPARATION THEREOF
Filed March 8, 1952

AVAILABILITIES OF LANGBEINITE—
PHOSPHATE ROCK FUSIONS VERSUS COMPOSITIONS

THREE COMPONENT DIAGRAM OF
SYSTEM, $MgSO_4$, $K_2SO_4$, PHOSPHATE ROCK

INVENTORS:
Grover L. Bridger and
David R. Boylan.

BY Dawson & Ooms,
ATTORNEYS.

United States Patent Office 2,782,113
Patented Feb. 19, 1957

2,782,113

FERTILIZER COMPOSITIONS AND METHOD OF PREPARATION THEREOF

Grover L. Bridger and David R. Boylan, Ames, Iowa, assignors to Iowa State College Research Foundation, Inc., Ames, Iowa, a corporation of Iowa Application March 8, 1952, Serial No. 275,578

2 Claims. (Cl. 71—47)

This invention relates to fertilizer compositions and method of preparation thereof. The method of this invention has particular utility in preparing novel fertilizer compositions from phosphate rock and langbeinite. The method of this invention can also be advantageously applied to the preparation of fertilizer compositions from phosphate rock and magnesium sulfate, or from phosphate rock, magnesium sulfate, and potassium sulfate.

Phosphate rock or apatite is a sedimentary rock containing calcium phosphate found in very large deposits throughout the world. The chemical formula of the main constituent of phosphate rock is generally given as $3Ca(PO_4)_2.CaF_2$. As can be seen from this formula, the primary constituent of phosphate rock is actually calcium fluorophosphate. Finely ground phosphate rock is used directly as a fertilizer for supplying phosphorus, which is a major nutritional requirement of most plants. The phosphorus content of phosphate rock, usually expressed as percent of phosphorus pentoxide ($P_2O_5$), is practically insoluble in pure water. However, the phosphorus is gradually brought into solution by the slightly active acids in the soil. This process requires considerable time, and plants lacking the advantage of branching root systems are not able to take adequate advantage of the phosphorus in phosphate rock.

It can be seen from the above that there is a need to make the phosphorus in phosphate rock more readily available. The method which has heretofore been most generally employed for accomplishing this result is to treat the phosphate rock with sulfuric acid to form superphosphate. Superphosphate contains the phosphorus in a much more soluble form, which is generally assumed to be mostly as mono-calcium phosphate.

The actual process for preparing commercial fertilizers from phosphate rock as it is generally practiced today is somewhat more complicated than indicated above. The usual process consists of the treatment of phosphate rock with sulfuric acid to form superphosphate as set out. The superphosphate is then cured or dried for several weeks, during which period it must be stored indoors, and thereafter it is mixed with other materials such as potassium chloride or ammonium nitrate, depending on the desired plant nutrients either as solids or in solution. The mixed product is subsequently dried, pulverized or granulated, and shipped in suitable containers, which are generally fiber or cloth bags. The disadvantages of this commercial process for preparing fertilizers from phosphate rock can be set out as follows:

(1) The acidulation of the phosphate rock with sulfuric acid increases the cost and difficulty of preparation of the fertilizer.

(2) Considerable time is required for curing or drying the superphosphate, which required large storage buildings, and a considerable inventory tie-up.

(3) The superphosphate product generally has a marked acidity, which in turn causes bag rot in the packaged fertilizer product.

(4) Other chemicals must be added to the superphosphate to supply the major plant nutrient potassium, and secondary plant nutrients such as magnesium generally must be separately supplied to the soil.

Langbeinite is obtained in large quantities as a by-product in the recovery of sylvinite (KCl) from the Permian salt beds occurring near Carlsbad, New Mexico. Langbeinite is a double salt of potassium sulfate and magnesium sulfate in the ratio of one mole of potassium sulfate to two moles of magnesium sulfate. Its formula can be written as $K_2SO_4.2MgSO_4$. Langbeinite is presently processed for the production of potassium sulfate by reacting the langbeinite with potassium chloride. The by-product of this reaction is magnesium chloride.

As indicated above, both phosphorus and potassium are important elements for plant growth. These elements are generally thought of as being used by plants in the form of their oxides, for example, as $P_2O_5$ and $K_2O$. It is generally agreed that phosphoric acid or phosphoric pentoxide and potash or potassium oxide are major plant nutrients. Most plants also require magnesium and calcium as secondary plant nutrients, and a lesser amount of sulfur. There are also other elements which are important in the nutrition of plants in greater or lesser amounts, but the elements mentioned are those with which the present invention is primarily concerned.

It is therefore a general object of this invention to provide a new method of producing fertilizer compositions from phosphate rock, which substantially overcomes the disadvantage of the superphosphate process set out above, while at the same time producing novel fertilizer compositions in which the phosphorus is readily available, and which in addition supply other plant nutrients such as magnesium, calcium, sulfur, and if desired potassium. It is a more specific object of this invention to provide a method of forming novel fertilizer compositions from phosphate rock and langbeinite which are characterized by high phosphorus ability. It is a still further object of this invention to provide a method of producing highly effective fertilizer compositions from phosphate rock and magnesium sulfate, or from phosphate rock, magnesium sulfate and potassium sulfate, all of which fertilizer compositions are characterized by high phosphorus availability and also by supplying magnesium and other nutritional elements in addition to phosphorus. Further objects and advantages will appear as the specification proceeds.

The general method of preparing the fertilizer compositions of this invention is centered around the important step of bringing about a heat fusion of a mixture of phosphate rock and the indicated metallic sulfates (magnesium, or magnesium and potassium sulfates). This step can readily be accomplished by feeding a mixture of controlled proportions of phosphate rock and the metallic sulfates into a suitable furnace wherein the minerals are melted and fused. Preferably, the raw materials are ground and thoroughly mixed before charging, and introduced into the furnace in an agglomerated form. The temperatures required to bring about the desired heat fusion of the phosphate rock and the metallic sulfates is generally within the range from about 2000 to 2500° F., although somewhat higher or lower temperatures can be employed if desired. The fused mass of phosphate rock and mineral sulfates is then rapidly cooled. Preferably, the hot fused mass of minerals, which may be at a temperature considerably above 2000° F., is cooled rapidly by quenching the molten mass in a suitable cooling medium, such as a stream or bath of water, steam, air, etc. Best results are obtained by employing a liquid cooling medium which will not substantially dissolve the product. The preferred liquid cooling medium is water saturated with a salt or mixtures of salts providing common ions with that of the fertilizer composition, such as potassium ions, magnesium ions, sulfate ions, etc. Langbeinite, or a mixture of magnesium sulfate and potassium sulfate are excellent salts for use in substantially saturating the aqueous cooling medium. When the molten mass of minerals is rapidly quenched, for example in water substantially saturated with langbeinite, the molten mass as it is cooled breaks up into granules. Rapid cooling of the fused mass is believed to be important in maximizing the availability of the phosphorus. This can be done most conveniently in a liquid cooling medium, since the melt is quickly broken up into small particles in the medium. The particles or granules can be separated by filtration, and used directly as fertilizer. If desired the granules can be subjected to a pulverizing operation to reduce the particle size.

As a specific example of the present invention, the following may be set out:

100 parts by weight of phosphate rock containing 32.5% $P_2O_5$ was mixed intimately with 187 parts by weight of langbeinite ($K_2SO_4.2MgSO_4$). The mixture was melted in a gas-fired furnace at 2200° F., and quickly cooled by quenching in a saturated aqueous solution of langbeinite. The product from the quenching operation was in granular form and was separated from the quenching solution by filtering. The granulated product was milky in appearance and quite soft. It was dried to remove moisture, and was then ground for immediate use without further storage or treatment. The chemical composition of the product thus produced is given in Table I.

Table I.—Analysis of typical fused fertilizer from langbeinite-phosphate fusion

|  | Total, Percent | Soluble, Percent |
|---|---|---|
| $P_2O_5$ | 13.8 | a 13.3 |
| $K_2O$ | 13.0 | b 12.4 |
| MgO | 11.5 | a 10.9 |
| F | 1.6 | | a Solubility in 2% citric acid.
b Solubility in hot water (Association of Official Agricultural Chemists procedure).

For the purpose of preparing fertilizer compositions of high phosphorus availability from phosphate rock by the method of this invention, it is important to control the proportions of phosphate rock to the metallic sulfates, and particularly to magnesium sulfate. Langbeinite is the preferred source of the sulfates of potassium and magnesium because of its cheapness and availability. When langbeinite is used to prepare the fertilizer compositions, at least 120 parts by weight of langbeinite should be fused with each 100 parts of phosphate rock. Preferably, at least 180 parts by weight of langbeinite should be fused with each 100 parts by weight of phosphate rock. The reasons for these limitations on the weight ratios of langbeinite to phosphate rock are indicated clearly in Fig. 1 of the drawing. Fig. 1 is a graph showing the effect on phosphorus availability (as $P_2O_5$) of varying the number of parts by weight of langbeinite per 100 parts of phosphate rock. The fusion compositions of langbeinite and phosphate rock upon which the curve of the graph in Fig. 1 is based were produced in accordance with the process set out in the specific example above. The phosphorus availability (as $P_2O_5$) was determined by the standard availability test using 2% citric acid. It will be noted that about 69% of the phosphorus in the fused fertilizer composition is readily available when 120 parts by weight of langbeinite are fused with 100 parts by weight of phosphate rock. When less than 120 parts by weight of langbeinite are fused with 100 parts of phosphate rock, the phosphorus availability falls off rapidly, and the product thus produced would not appear to be of commercial importance as compared with superphosphate. However, at proportions above about 120 parts by weight of langbeinite to 100 parts of phosphate rock the fertilizer compositions may be said to be characterized by high phosphorus availability, and therefore to be of considerable commercial importance. When 180 parts by weight of langbeinite or greater are fused with 100 parts by weight of phosphate rock as preferred, substantially all of the phosphorus in the resulting fertilizer composition is readily available, as indicated by the flat portion of the curve running substantially parallel with the 100% availability line on the graph of Fig. 1.

Mixtures of potassium sulfate and magnesium sulfate in the same proportions as in langbeinite will give the same result when fused with phosphate rock. In addition, it has been discovered that other proportions of potassium sulfate and magnesium sulfate can be employed, and that magnesium sulfate alone may be used. The results of fusion studies of the three component system, magnesium sulfate-potassium sulfate-phosphate rock are reported in Table II, and the data of Fig. 2 have been used to plot the three component diagram of Fig. 2.

Table II.—Results of fusion studies of the three component system, magnesium sulfate-potassium sulfate-phosphate rock.

| Fusion | Original Comp.a | | | Product Comp. | | Percent Availability (Citric Acid Solubility) |
|---|---|---|---|---|---|---|
| | $MgSO_4$, Percent | $K_2SO_4$, Percent | Rock, Percent | Citric $P_2O_5$, Percent | Total $P_2O_5$, Percent | |
| H-1 | 12 | 48 | 40 | 4.4 | 13.1 | 33 |
| G-1 | 14 | 56 | 30 | 4.0 | 7.8 | 50 |
| E-2 | 20 | 30 | 50 | 5.6 | 12.0 | 46 |
| D-2 | 24 | 36 | 40 | 7.2 | 12.4 | 60 |
| C-2 | 28 | 42 | 30 | 8.21 | 10.3 | 80 |
| B-2 | 32 | 48 | 20 | 7.9 | 8.0 | 99 |
| I-3 | 29 | 21 | 50 | 7.75 | 16.8 | 46 |
| D-3 | 34.8 | 25.2 | 40 | 13.3 | 13.8 | 96 |
| C-3 | 40.6 | 29.4 | 30 | 11.9 | 11.2 | 100 |
| B-3 | 46.4 | 33.6 | 20 | 7.4 | 7.4 | 100 |
| E-4 | 37.5 | 12.5 | 50 | 16.9 | 17.0 | 99 |
| D-4 | 45 | 15 | 40 | 14.6 | 14.6 | 100 |
| G-4 | 52.5 | 17.5 | 30 | 10.0 | 10.0 | 100 |
| B-4 | 60 | 20 | 20 | 7.6 | 7.2 | 100 |
| F-5 | 40 | | 60 | 16.20 | 20.75 | 78 |
| E-5 | 50 | | 50 | 17.55 | 18.40 | 96 |
| B-5 | 80 | | 20 | 6.30 | 6.20 | 100 |
| A-5 | 90 | | 10 | 3.40 | 3.35 | 100 | a Percent by weight.

Figure 2:
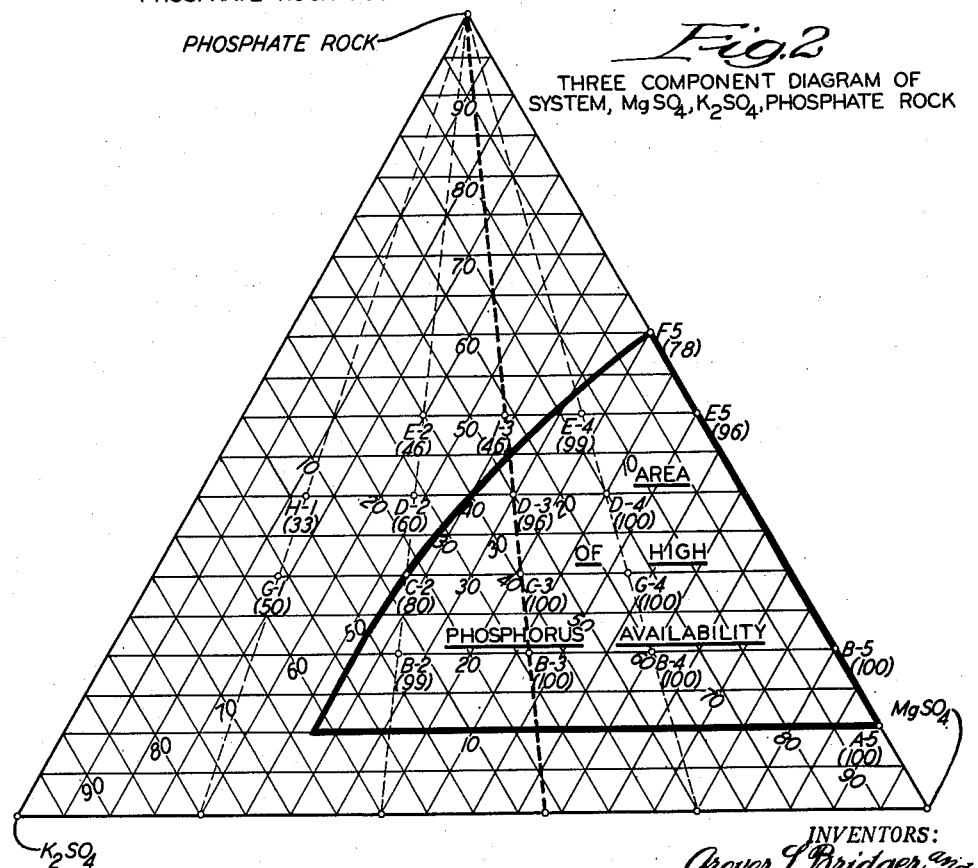

On the basis of the figures set out in Table II and particularly on the basis of the three component diagram of Fig. 2, it can be seen that the proportions of phosphate rock, magnesium sulfate, and potassium sulfate can be varied considerably while producing a fused fertilizer composition of high phosphorus availability. The area of high phosphorus availability is labeled on the three component diagram of Fig. 2 and is bounded by a solid relatively heavy line. The numbers in parentheses on the diagram of Fig. 2 indicate the percent of the $P_2O_5$ in the fertilizer product which is soluble in 2% citric acid, and correspond with the values appearing opposite the corresponding fusion code numbers in Table II. The points on the three component diagram of Fig. 2 falling within the area of high phosphorus availability including the points falling on the boundary line all represent possible fertilizer compositions which substantially achieve the objects of this invention. It will be understood that each point on the three component diagram of Fig. 2 positively fixes the proportions of the three ingredients of the fused fertilizer composition to each other, that is, the relative proportions of phosphate rock, potassium sulfate, and magnesium sulfate. Since the purpose of the present invention is to prepare fertilizer composition from phosphate rock, the area of high phosphorus availability of Fig. 2 has not been indicated as extending below compositions containing less than 10% by weight of phosphate rock. However, this does not mean that substantially complete phosphate availability is not obtained for the total area falling under the curve forming the upper boundary of the area of high phosphorus availability. The relatively heavy dotted line extending through several points within the area of high phosphorus availability represents compositions which can be produced by fusing langbeinite with phosphate rock. It will be noted that the desirable proportions as previously set out for producing fertilizer in this manner correspond with those indicated by Fig. 2. The three component diagram of Fig. 2 also shows that while fertilizer compositions of high phosphorus availability cannot be prepared by fusing phosphate rock with potassium sulfate in the absence of magnesium sulfate, they can be produced by fusing phosphate rock with magnesium sulfate in the absence of potassium sulfate. More specifically, fertilizer compositions of high phosphorus availability can be produced by fusing at least 40 parts by weight of magnesium sulfate with each 60 parts by weight of phosphate rock. Preferably, at least 50 parts by weight of magnesium sulfate are fused with each 50 parts by weight of phosphate rock.

While it is preferred to form the fertilizer compositions of this invention by fusing phosphate rock with magnesium sulfate or a mixture of magnesium sulfate and potassium sulfate, other inorganic salts can be present in minor proportions during the fusion operations if desired. Phosphate rock itself can be expected to contain a certain amount of mineral impurities, and these have not been found to interfere with the production of fertilizers of high phosphorus availability. The data set out above is based on experiments with a typical phosphate rock containing 32.5% $P_2O_5$. Commercial phosphate rock may vary from 30 to 35% in $P_2O_5$ content. Therefore, it may be desirable to slightly vary the preferred composition set out above to maximize the availability of the phosphorus.

If desired, other salts for supplying the nutritional requirements of plants can be mixed with the pulverized fused fertilizer product of this invention, prior to the use of the fertilizer by introducing it into the soil.

While in the foregoing specification specific embodiments of this invention have been set forth in great detail for purpose of illustration, it will be understood that many of the details set forth can be varied widely without departing from the spriit of the invention.

We claim:
1. The method of producing a fertilizer composition from phosphate rock characterized by high phosphorus availability, comprising mixing phosphate rock with metallic sulphates selected from the group consisting of magnesium sulphate and a mixture of magnesium sulphate and potassium sulphate, controlling the relative proportions of phosphate rock to said metallic sulphates in the mixture so that said proportions are defined by a point falling within the labeled area of high phosphorus availability in the three component diagram of Figure 2, said area including the points falling on the solid boundary line therearound, heating said mixture to a temperature at which it can be completely melted, continuing said heating at said melting temperature until said mixture is converted to a fused, molten mass, then quenching said fused, molten mass to produce a fertilizer product characterized by high phosphorus availability.

2. The method of producing a fertilizer composition from phosphate rock and langbeinite, comprising mixing phosphate rock and langbeinite, controlling the relative proportions of phosphate rock to langbeinite in the mixture so that said mixture contains at least ten percent by weight of phosphate rock and at least 120 parts by weight of langbeinite per 100 parts by weight of phosphate rock, heating said mixture to a temperature at which it can be completely melted, continuing said heating at said melting temperature until said mixture is converted to a fused, molten mass, and then quenching said fused, molten mass to produce a fertilizer product.

References Cited in the file of this patent

UNITED STATES PATENTS

| | | |
|---|---|---|
| 959,841 | Carpenter | May 31, 1910 |
| 1,103,910 | Wilson et al. | July 14, 1914 |
| 1,397,629 | Fry | Nov. 22, 1921 |
| 1,413,168 | Kriess | Apr. 18, 1922 |
| 2,446,978 | Maust | Aug. 10, 1948 |

FOREIGN PATENTS

| | | |
|---|---|---|
| 2,724 | Great Britain | 1863 |
| 512 | Great Britain | 1865 |
| 237,875 | Great Britain | May 13, 1926 |
| 301,022 | Great Britain | July 18, 1929 |

OTHER REFERENCES

Industrial and Engineering Chemistry, Langbeinite—Mining and Processing, vol. 39, No. 1, January 1947, pages 43–47.